United States Patent [19]
Sakamoto et al.

[11] Patent Number: 5,640,390
[45] Date of Patent: Jun. 17, 1997

[54] WIRELESS COMMUNICATION NETWORK SYSTEM

[75] Inventors: Atsushi Sakamoto, Tokyo; Motoyasu Nagashima, Kashiwa; Kazumasa Taninaka, Tokyo; Kouji Nishimura, Asaka, all of Japan

[73] Assignees: Victor Compay of Japan, Ltd., Yokohama; NTT Data Communications Systems Corporation, Tokyo, both of Japan

[21] Appl. No.: 269,584

[22] Filed: Jul. 1, 1994

[30] Foreign Application Priority Data

Jul. 5, 1993 [JP] Japan ............................ 5-191762

[51] Int. Cl.$^6$ ............................................ H04L 12/413
[52] U.S. Cl. ........................ 370/346; 370/445; 359/136
[58] Field of Search .................. 370/95.1, 95.2, 370/85.1, 85.2, 85.4, 85.6, 85.08, 85.3, 94.1, 94.2, 94.3, 60, 60.1, 85.13, 92, 85.11, 85.9, 69.1, 57, 100.1; 340/825.5, 825.51, 825.52, 825.08

[56] References Cited

U.S. PATENT DOCUMENTS

| | | |
|---|---|---|
| 3,728,681 | 4/1973 | Fuller et al. ........................ 370/85.8 |
| 4,689,619 | 8/1987 | O'Brien, Jr. ........................ 370/95.2 |
| 5,297,144 | 3/1994 | Gilbert et al. ...................... 370/95.2 |
| 5,329,531 | 7/1994 | Diepstraten et al. ................ 370/85.3 |
| 5,369,639 | 11/1994 | Kammerman et al. .............. 370/85.3 |
| 5,371,739 | 12/1994 | Knapczyk ........................... 370/85.3 |
| 5,373,503 | 12/1994 | Chen ................................... 370/95.2 |
| 5,379,290 | 1/1995 | Kleijne ............................... 370/85.3 |

Primary Examiner—Dang Ton
Attorney, Agent, or Firm—Lowe, Price, LeBlanc & Becker

[57] ABSTRACT

A wireless communication network system includes a communication controller, and a plurality of terminal devices which can communicate with the communication controller by wireless. The communication controller includes a first section for detecting absence of a received signal from any of the terminal devices, and a second section responsive to an output signal of the first section for periodically generating a nonbusy signal, which can be discriminated from another signal transmitted from the communication controller, in the absence of the received signal. Each of the terminal devices includes a third section for detecting the nonbusy signal, and a fourth section responsive to an output signal of the third section for permitting transmission from the terminal device after the nonbusy signal is received by the third section.

12 Claims, 6 Drawing Sheets

WIRELESS COMMUNICATION NETWORK SYSTEM

BACKGROUND OF THE INVENTION

1. Field of the Invention

This invention relates to a wireless communication network system such as a wireless LAN (local area network) system which has a host device (a central device) and a plurality of terminal devices which can communicate with the host device by wireless, for example, radio or light.

It should be understood herein that reference to "optical" and "light" include infrared radiations as well as visible light.

2. Description of the Prior Art

A general wireless LAN system of the CSMA (carrier sense multiple access) type has a central controller (a host device) and a plurality of terminal devices which can communicate with the central controller by wireless. Generally, each of the terminal devices is designed to provide the following function. In cases where the terminal device is required to transmit a signal toward the central controller, the terminal device detects whether or not a signal from the central controller is currently received. The terminal device executes signal transmission when a signal from the central controller is detected to be currently absent. Otherwise, the terminal device does not execute signal transmission.

In the wireless LAN system, when two different terminal devices simultaneously transmit signals toward the central controller, the transmitted signals tend to interfere with each other. The signal interference causes a failure in communication among the terminal devices and the central controller.

SUMMARY OF THE INVENTION

It is an object of this invention to provide an improved wireless communication network system.

It is another object of this invention to provide an improved terminal device for use in a wireless communication network system.

A first aspect of this invention provides a wireless communication network system comprising a communication controller; and a plurality of terminal devices which can communicate with the communication controller by wireless; wherein the communication controller comprises first means for detecting absence of a received signal from any of the terminal devices, and second means responsive to an output signal of the first means for periodically generating a nonbusy signal, which can be discriminated from another signal transmitted from the communication controller, in the absence of the received signal; wherein each of the terminal devices comprises third means for detecting the nonbusy signal, and fourth means responsive to an output signal of the third means for permitting transmission from the terminal device after the nonbusy signal is received by the third means.

A second aspect of this invention provides a wireless LAN communication network system comprising a LAN line; a communication controller connected to the LAN line; and a plurality of terminal devices which can communicate with the communication controller by wireless; wherein the communication controller comprises first means for detecting absence of a transmission signal from the LAN line and absence of a received signal from any of the terminal devices, and second means responsive to an output signal of the first means for periodically generating a nonbusy signal, which can be discriminated from another signal transmitted from the communication controller, in the absence of the transmission signal and the absence of the received signal; wherein each of the terminal devices comprises third means for detecting the nonbusy signal, and fourth means responsive to an output signal of the third means for permitting transmission from the terminal device after the nonbusy signal is received by the third means.

A third aspect of this invention provides a terminal device for use in a wireless communication network system which comprises first means for receiving a nonbusy signal; second means responsive to an output signal of the first means for permitting data transmission after the nonbusy signal is received by the first means; third means responsive to the output signal of the first means for setting a random value in response to a first nonbusy signal; fourth means for counting periodically-received nonbusy signals; fifth means for deciding whether or not a counted value of the nonbusy signals and the random value are in a predetermined relation; and sixth means for starting transmission before a next nonbusy signal is received in cases where the counted value of the nonbusy signal and the random value are in the predetermined relation.

A fourth aspect of this invention provides a wireless communication network system comprising first and second devices which can communicate with each other by wireless; the first device comprising first means for detecting whether or not the first device is in a predetermined nonbusy state, and second means connected to the first mesas for transmitting a predetermined nonbusy signal to the second device when the first device is detected to be in the nonbusy state by the first means; the second device comprising third means for receiving the nonbusy signal from the first device, and fourth mesas connected to the third means for transmitting a communication signal to the first device when the nonbusy signal is received by the third device.

A fifth aspect of this invention provides a wireless communication network system comprising a central device; first and second terminal devices each capable of transmitting a signal to the central device by wireless; and mesas for preventing the first and second terminal devices from simultaneously transmitting signals to the central device.

DESCRIPTION OF THE PREFERRED EMBODIMENT

Figure 1:
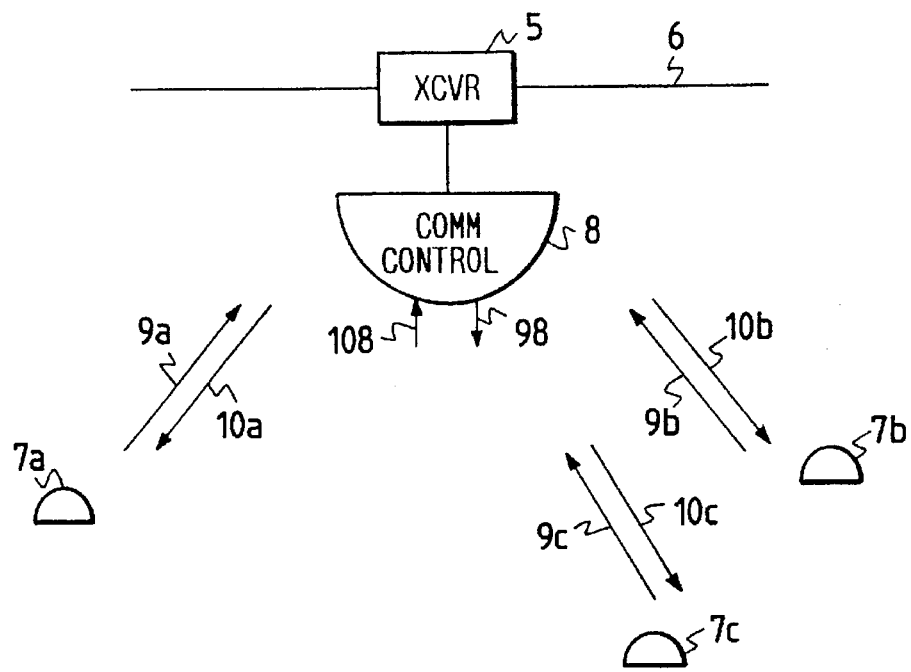
FIG. 1 is a diagram of a wireless LAN system according to an embodiment of this invention.

With reference to FIG. 1, a wireless LAN (local area network) system includes a transceiver 5 connected to a LAN cable 6 composed of a coaxial cable or an optical fiber. Also, other transceivers (not shown) and terminal devices (not shown) are connected to the LAN cable 6. The transceiver 5 is connected to a communication controller or a central device 8 which can communicate with a plurality of terminal devices 7a and 7b by wireless such as light or radio.

There is a service zone around the central device 8. When a terminal device is located in the service zone, the terminal device can communicate with the central device 8. When a terminal device is located outside the service zone, the terminal device can not communicate with the central device 8. In FIG. 1, the terminal devices 7a and 7b are located in the service zone while a terminal device 7c is located outside the service zone.

In FIG. 1, a signal transmitted from and a signal received by the terminal device 7a are denoted by reference characters 9a and 10a respectively. A signal transmitted from and a signal received by the terminal device 7b are denoted by reference characters 9b and 10b respectively. A signal transmitted from and a signal received by the terminal device 7c are denoted by reference characters 9c and 10c respectively. A signal transmitted from and a signal received by the central device 8 are denoted by reference characters 9S and 10S respectively.

Figure 2:
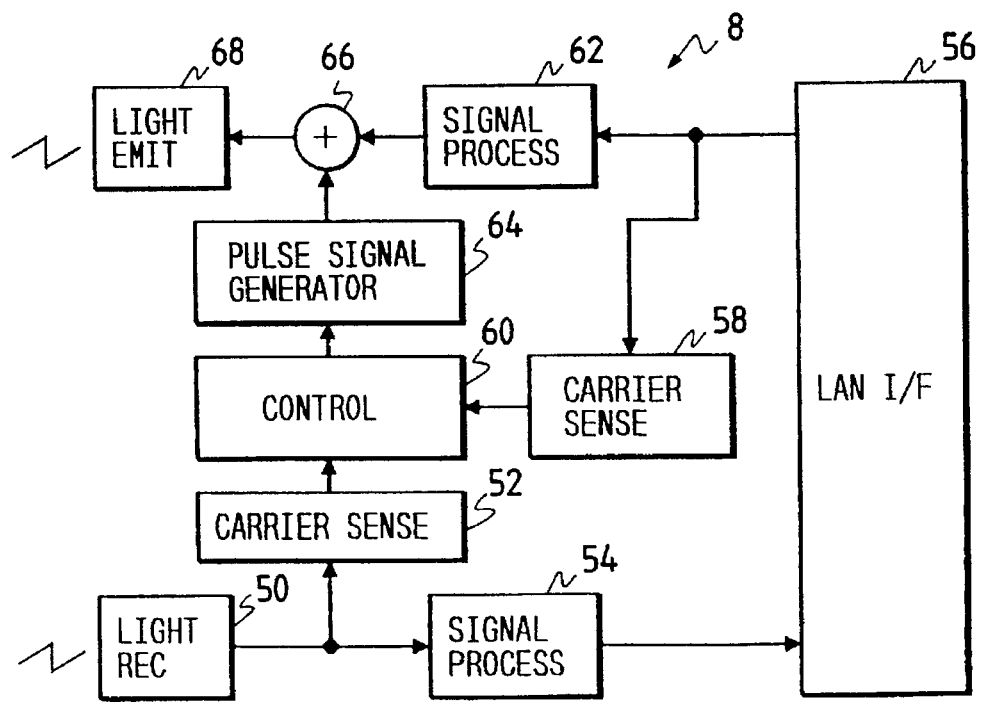
FIG. 2 is a block diagram of a communication controller in FIG. 1.

As shown in FIG. 2, the communication controller (the central device) 8 includes a light receiver 50, a carrier sensor 52, a signal processor 54, a LAN interface 56, a carrier sensor 58, a controller 60, a signal processor 62, a pulse signal generator 64, an adder 66, and a light emitter 68.

The output side of the light receiver 50 is connected to the input sides of the carrier sensor 52 and the signal processor 54. The output side of the carrier sensor 52 is connected to the controller 60. The output side of the signal processor 54 is connected to the LAN interface 56. The input side of the carrier sensor 58 is connected to the LAN interface 56. The output side of the carrier sensor 58 is connected to the controller 60. The input side of the signal processor 62 is connected to the LAN interface 56. The output side of the signal processor 62 is connected to a first input terminal of the adder 66. A control terminal of the pulse signal generator 64 is connected to the controller 60. The output terminal of the pulse signal generator 64 is connected to a second input terminal of the adder 66. The output terminal of the adder 66 is connected to the input side of the light emitter 68.

The LAN interface 56 is connected to the transceiver 5 (see FIG. 1). The LAN interface 56, the transceiver 5, and the LAN cable 6 (see FIG. 1) enable the communication controller 8 to communicate with the other transceivers and the terminal devices connected to the LAN cable 6.

The light receiver 50 has a photosensor part, receiving an optical signal from a terminal device and converting the optical signal into a corresponding electric signal. The light receiver 50 outputs the electric signal to the carrier sensor 52 and the signal processor 54. The output signal of the light receiver 50 is equal to a signal which results from modulating a carrier with transmitted information (data). The optical signal handled by the light receiver 50 uses infrared light or visible light. It should be noted that the optical signal may be replaced by a radio-wave signal.

The carrier sensor 52 serves to detect the carrier in the output signal of the light receiver 50. When an optical signal is received by the light receiver 50, the carrier sensor 52 detects the presence of the carrier in the output signal of the light receiver 50. When any optical signal is not received by the light receiver 50, the carrier sensor 52 detects the absence of the carrier from the output signal of the light receiver 50. The carrier detected by the carrier sensor 52 is referred to as a carrier "a".

The signal processor 54 subjects the output signal of the light receiver 50 to predetermined processes such as a decoding process, an error checking process, and a sync correcting process. The signal processor 54 outputs the process-resultant signal to the LAN interface 56.

The carrier sensor 58 serves to detect a carrier in an output signal of the LAN interface 56 which is a signal transmitted via the LAN cable 6 (see FIG. 1), the transceiver 5 (see FIG. 1), and the LAN interface 56. When an active signal is transmitted to the communication controller 8 via the transceiver 5, the carrier sensor 58 detects the presence of the carrier in the output signal of the LAN interface 56. When any active signal is not transmitted to the communication controller 8 via the transceiver 5, the carrier sensor 58 detects the absence of the carrier from the output signal of the LAN interface 56. The carrier detected by the carrier sensor 58 is referred to as a carrier "b".

The signal processor 62 subjects the output signal of the LAN interface 56 to predetermined processes such as an encoding process and a process of adding error check bits. The signal processor 62 outputs the process-resultant signal to the adder 66.

The controller 60 receives the output signal from the carrier sensor 52 which represents the presence or the absence of the carrier "a". Also, the controller 60 receives the output signal from the carrier sensor 58 which represents the presence or the absence of the carrier "b". The controller 60 generates a control signal in response to the output signals from the carrier sensors 52 and 58.

The controller 60 outputs the control signal to the pulse signal generator 64.

The pulse signal generator 64 produces a nonbusy signal in response to the control signal from the controller 60. The nonbusy signal is a pulse signal having a predetermined pulse width. Under given conditions, the nonbusy signal is periodically generated at a predetermined period.

The adder 66 receives the output signal from the signal processor 62. Also, the adder 66 receives the output signal from the pulse signal generator 64 which can contain the nonbusy signal. The adder 66 combines the output signal from the signal processor 62 and the output signal from the pulse signal generator 64 into a composite signal. The adder 66 outputs the composite signal to the light emitter 68. It should be noted that the adder 66 can be an OR circuit.

The light emitter 68 converts the output signal of the adder 66 into a corresponding optical signal, and emits the optical signal. The optical signal radiated from the light emitter 68 uses infrared light or visible light. It should be noted that the optical signal may be replaced by a radio-wave signal.

Figure 3:
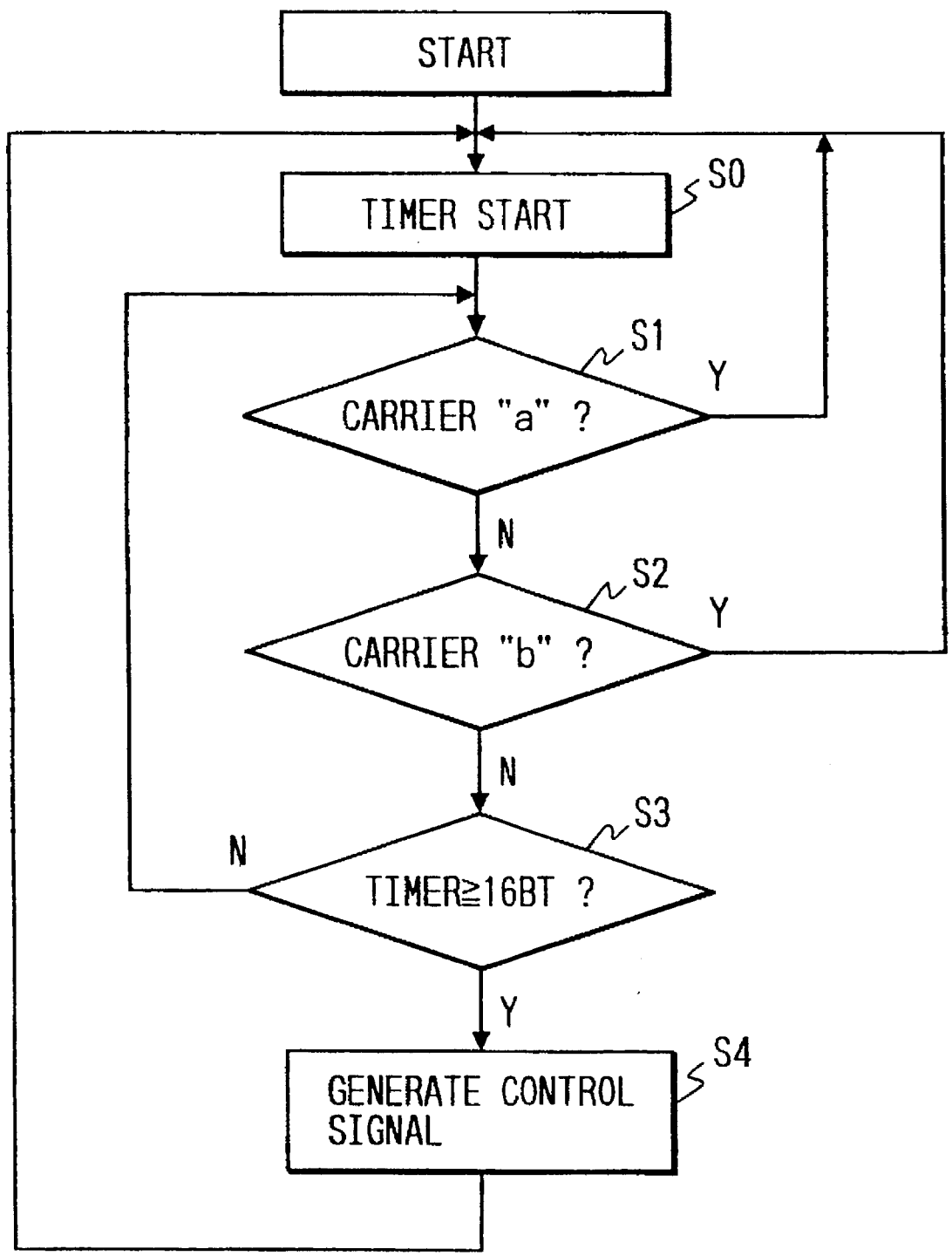
FIG. 3 is a flowchart of a program for operating a controller in FIG. 2.

The controller 60 includes a CPU having a combination of a processing section, an I/O port, a ROM, and a RAM. The controller 60 operates in accordance with a program stored in the ROM. FIG. 3 is a flowchart of the program.

As shown in FIG. 3, a first step S0 of the program resets and starts a timer. In other words, the step S0 resets an elapsed time TE to zero and starts to measure the elapsed time TE. After the step S0, the program advances to a step S1. The step S1 decides whether the carrier "a" is present or absent by referring the output signal from the carrier sensor 52. When the carrier "a" is decided to be present, the program returns from the step S1 to the step S0. When the carrier "a" is decided to be absent, the program advances from the step S1 to a step S2. The step S2 decides whether the carrier "b" is present or absent by referring the output signal from the carrier sensor 58. When the carrier "b" is decided to be present, the program returns from the step S2 to the step S0. When the carrier "b" is decided to be absent, the program advances from the step S2 to a step S3. The step S3 compares the elapsed time TE with a predetermined reference time Tref which corresponds to 16 BT (that is, a 16-byte time or a time of 16 bytes). When the elapsed time TE is shorter than the reference time Tref, the program returns from the step S3 to the step S1. When the elapsed time TE is equal to or longer than the reference time Tref, the program advances from the step S3 to a step S4. The step S4 outputs a control signal or a trigger pulse to the pulse signal generator 64. After the step S4, the program returns to the step S0.

In cases where both the carriers "a" and "b" remain absent, the controller 60 periodically outputs a trigger pulse to the pulse signal generator 64 at a period substantially corresponding to 16 BT. The pulse signal generator 64 outputs a nonbusy pulse (a nonbusy signal) in response to every trigger pulse from the controller 60. Accordingly, in these cases, the pulse signal generator 64 periodically outputs a nonbusy pulse (a nonbusy signal) to the adder 66 at a period substantially corresponding to 16 BT. Every nonbusy pulse outputted from the pulse signal generator 64 has a predetermined duration (width) corresponding to 4 BT (that is, a 4-byte time or a time of 4 bytes). The pulse signal generator 64 may include a monostable multivibrator.

On the other hand, in cases where at least one of the carriers "a" and "b" is present, the controller 60 fails to output a trigger pulse so that the pulse signal generator 64 does not output any nonbusy pulse (any nonbusy signal).

The nonbusy signal (the nonbusy pulse) has a predetermined form which can be distinguished from a normal communication signal transmitted from the LAN cable 6 and a normal communication signal transmitted from the terminal device 7a, 7b, or 7c.

The communication controller 8 may be not connected to the LAN cable 6 via the transceiver 5. In this case, the carrier sensor 58 and the step S2 are omitted so that the controller 60 outputs a trigger pulse in response to only whether the carrier "a" is present or absent.

When no signal is transmitted from the LAN cable 6, the carrier sensor 58 and the step S2 may be omitted. In this case, the controller 60 outputs a trigger pulse in response to only whether the carrier "a" is present or absent.

The nonbusy signal may be modified as follows. A first modification of the nonbusy signal has a predetermined duration shorter than the duration of shortest data in a data signal or the packet length of a communication signal. A second modification of the nonbusy signal contains information of a predetermined address different from addresses assigned to the respective terminal devices 7a, 7b, and 7c. A third modification of the nonbusy signal has a predetermined frequency different from the frequency of a data signal.

The controller 60 may be changed into the following modification. The modification of the controller 60 measures the elapsed time during which both the carriers "a" and "b" continue to be absent. The modification of the controller 60 varies the interval between temporally-adjacent nonbusy pulses in accordance with the measured elapsed time.

Figure 4:
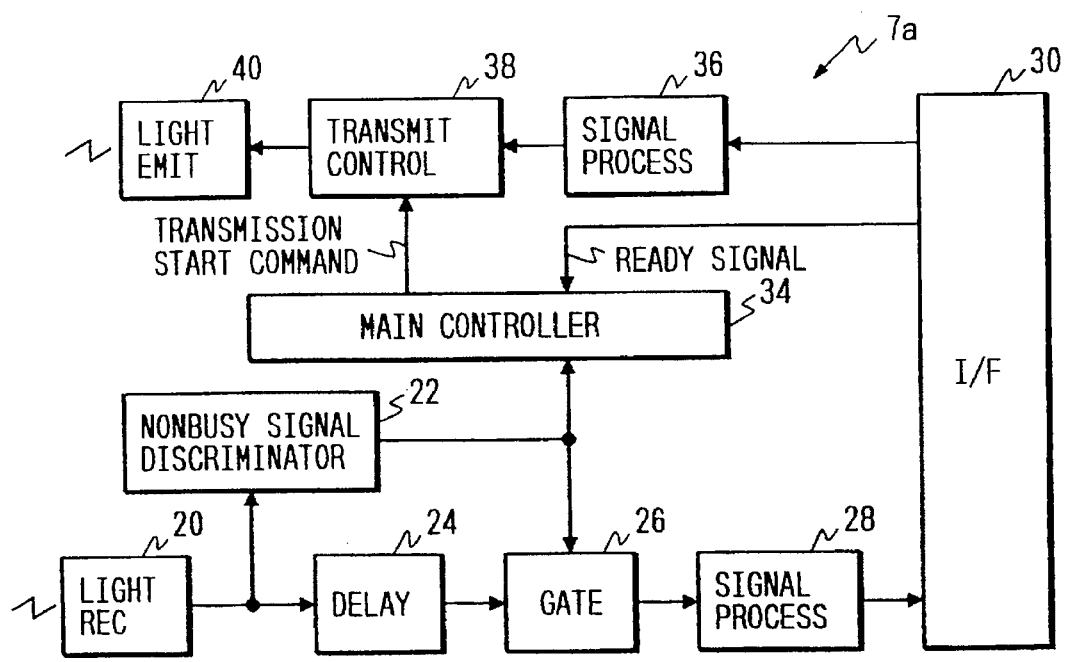
FIG. 4 is a block diagram of a terminal device in FIG. 1.

The terminal devices 7a, 7b, and 7c have similar structures. Only the structure of the terminal device 7a will be described hereinafter. As shown in FIG. 4, the terminal device 7a includes a light receiver 20, a nonbusy signal discriminator 22, a delay circuit 24, a gate 26, a signal processor 28, an interface 30, a main controller 34, a signal processor 36, a transmission controller 38, and a light emitter 40.

The output side of the light receiver 20 is connected to the input sides of the nonbusy signal discriminator 22 and the delay circuit 24. The output side of the nonbusy signal discriminator 22 is connected to the main controller 34. In addition, the output side of the nonbusy signal discriminator 22 is connected to a control terminal of the gate 26. The output side of the delay circuit 24 is connected to the input side of the gate 26. The output side of the gate 26 is connected to the input side of the signal processor 28. The output side of the signal processor 28 is connected to the interface 30. The main controller 34 is connected to the interface 30. Also, the main controller 34 is connected to a control terminal of the transmission controller 38. The input side of the signal processor 36 is connected to the interface 30. The output side of the signal processor 36 is connected to the input side of the transmission controller 38. The output side of the transmission controller 38 is connected to the input side of the light emitter 40.

The light receiver 20 has a photosensor part, receiving an optical signal from the central device 8 (see FIG. 1) or another terminal device (the terminal device 7b or 7c) and converting the optical signal into a corresponding electric signal. The light receiver 20 outputs the electric signal to the nonbusy signal discriminator 22 and the delay circuit 24. The output signal of the light receiver 20 is equal to a signal which results from modulating a carrier with transmitted information (data and nonbusy signals). The optical signal handled by the light receiver 20 uses infrared light or visible light. It should be noted that the optical signal may be replaced by a radio-wave signal.

The nonbusy signal discriminator 22 includes a pulse-width detector which decides whether or not the width of a pulse in the output signal of the light receiver 20 is equal to 4 BT. When the width of a pulse in the output signal of the light receiver 20 is equal to 4 BT, the nonbusy signal discriminator 22 recognizes the pulse as a nonbusy pulse (a nonbusy signal). When the width of a pulse in the output signal of the light receiver 20 is not equal to 4 BT, the nonbusy signal discriminator 22 recognizes the pulse as being different from a nonbusy pulse (a nonbusy signal). In this way, the nonbusy signal discriminator 22 detects the presence or the absence of a nonbusy signal in or from the output signal of the light receiver 20. The nonbusy signal discriminator 22 feeds the gate 26 and the main controller 34 with a signal representing the presence or the absence of a nonbusy signal.

The nonbusy signal discriminator 22 may be designed to select pulses having a predetermined duration corresponding to 4 BT. In this case, the nonbusy signal discriminator 22 extracts a nonbusy pulse from the output signal of the light receiver 20, and passes the nonbusy pulse to the gate 26 and the main controller 34.

When the nonbusy signal is modified into a form which contains information of a predetermined address, the nonbusy signal discriminator 22 is designed to detect the presence or the absence of the nonbusy signal by referring to the address information. When the nonbusy signal is modified into a form having a predetermined frequency different from the frequency of a data signal, the nonbusy signal discriminator 22 is designed to detect the presence or the absence of the nonbusy signal by using a band pass filter tuned to the predetermined frequency.

The circuit 24 delays the output signal of the light receiver 20 by a predetermined time, and outputs the delay-resultant signal to the gate 26. The gate 26 is selectively closed or opened in response to the output signal of the nonbusy signal discriminator 22. Specifically, the gate 26 is closed when the output signal of the nonbusy signal discriminator 22 represents the presence of a nonbusy signal. Otherwise, the gate 26 is opened. Accordingly, the gate 26 removes or deletes the nonbusy signal from the output signal of the delay circuit 24, and outputs a resultant signal to the signal processor 28.

The signal processor 28 subjects the output signal of the gate 26 to predetermined processes such as a decoding process, an error checking process, and a sync correcting process. The signal processor 28 outputs the process-resultant signal to the interface 30.

The interface 30 is connected to a computer (not shown) or another apparatus (not shown) having data transmitting and receiving functions. The interface 30 outputs a communication data signal to the signal processor 36. The interface 30 outputs a ready signal to the main controller 34 which represents the presence of data to be transmitted from the present terminal device 7a.

The signal processor 36 subjects the communication data signal from the interface 30 to predetermined processes such as an encoding process and a process of adding error check bits. The signal processor 36 outputs the process-resultant signal to the transmission controller 38.

The main controller 34 generates a transmission starting command signal in response to the output signal of the nonbusy signal discriminator 22 and the read signal from the interface 30.

The main controller 34 outputs the transmission starting command signal to the transmission controller 38.

The transmission controller 38 includes a memory or a buffer which stores the output signal from the signal processor 36. When the transmission controller 38 receives a transmission starting command signal from the main controller 34, the signal is read out from the memory or the buffer and is then outputted to the light emitter 40. In the absence of a transmission starting command signal, the signal remains not read out from the memory or the buffer.

The light emitter 40 converts the output signal of the transmission controller 38 into a corresponding optical signal, and emits the optical signal. The optical signal radiated from the light emitter 40 uses infrared light or visible light. It should be noted that the optical signal may be replaced by a radio-wave signal.

As understood from the previous description, in the presence of a transmission starting command signal, the transmission controller 38 permits the travel of the output signal from the signal processor 36 to the light emitter 40 so that the output signal from the signal processor 36 can be transmitted from the light emitter 40 as an optical signal. In the absence of a transmission starting command signal, the transmission controller 38 inhibits the travel of the output signal from the signal processor 36 to the light emitter 40 so that the output signal from the signal processor 36 will not be transmitted from the light emitter 40 as an optical signal.

Figure 5:
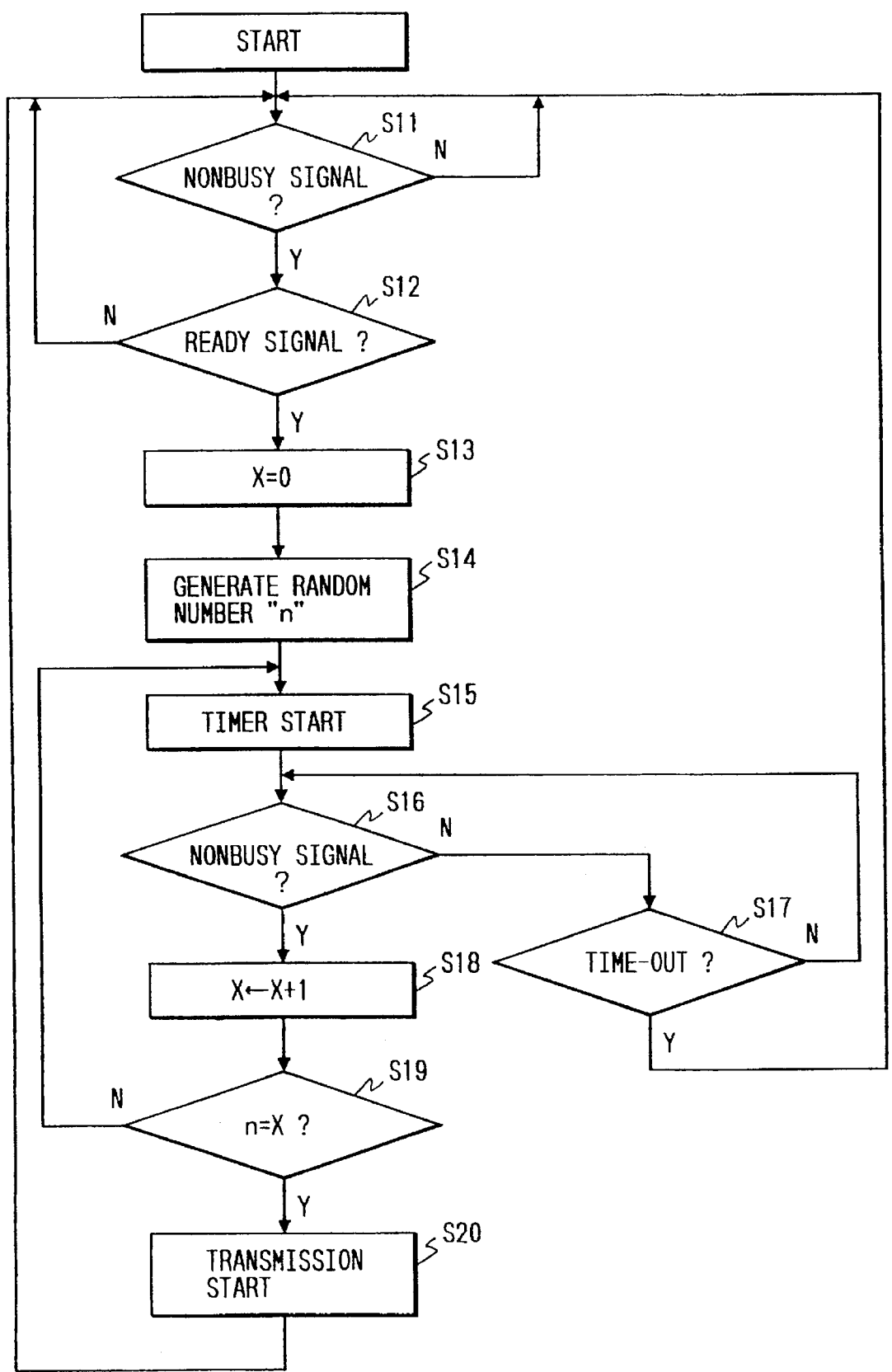
FIG. 5 is a flowchart of a program for operating a main controller in FIG. 4.

The main controller 34 includes a CPU having a combination of a processing section, an I/O port, a ROM, and a RAM. The main controller 34 operates in accordance with a program stored in the ROM. FIG. 5 is a flowchart of the program.

As shown in FIG. 5, a first step S11 of the program decides whether or not a nonbusy signal is currently present in the output signal of the light receiver 20 by referring to the output signal of the nonbusy signal discriminator 22. When a nonbusy signal is decided to be currently present, the program advances from the step S11 to a step S12. Otherwise, the step S11 is repeated. The step S12 decides whether or not a ready signal is currently received from the interface 30. When a ready signal is decided to be currently received, the program advances from the step S12 to a step S13. Otherwise, the program returns from the step S12 to the step S11. The step S13 resets or initializes a counted number X to zero. A step S14 following the step S13 generates a random number "n". For example, the generation of a random number "n" is executed by selecting arbitrary one of predetermined different random numbers composing a random number table. After the step S14, the program advances to a step S15. The step S15 resets and starts a timer. In other words, the step S15 resets an elapsed time TE0 to zero and starts to measure the elapsed time TE0. After the step S15, the program advances to a step S16. The step S16 decides whether or not a nonbusy signal is currently present in the output signal of the light receiver 20 by referring to the output signal of the nonbusy signal discriminator 22. When a nonbusy signal is decided to be currently present, the program advances from the step S16 to a step S18. Otherwise, the program advances from the step S16 to a step S17. The step S18 increments the counted number X by "1". A step S19 following the step S18 decides whether or not the counted number X has reached the random number "n". When the counted number X has reached the random number "n", the program advances from the step S19 to a step S20. Otherwise, the program returns from the step S19 to the step S15. The step S20 outputs a transmission starting command signal to the transmission controller 38. After the step S20, the program returns to the step S11. The step S17 compares the elapsed time TE0 with a predetermined reference time Tref0 equal to, for example, about 1 minute. When the elapsed time TE0 is shorter than the reference time Tref0, the program returns from the step S17 to the step S16. When the elapsed time TE0 is equal to or longer than the reference time Tref0, the program returns from the step S17 to the step S11.

As understood from the previous description, in cases where nonbusy signals and a ready signal continue to be received, the main controller 34 outputs a transmission starting command signal at a moment which follows the moment of the commencement of the reception of the nonbusy signals and the ready signal by a time interval determined by the random number "n". Specifically, in these cases, the main controller 34 outputs a transmission starting command signal when the present terminal device has received a given number of nonbusy signals which corresponds to the random number "n".

On the other hand, in cases where nonbusy signals continue to be not received or a ready signal continues to be not received, the main controller 34 does not output any transmission starting command signal.

The steps S16 and S17 cooperate to provide a function of waiting a second nonbusy pulse after a first nonbusy pulse has been received. In addition, the steps S16 and S17 cooperate to provide the following function. In cases where a communication disturbance or another cause continues to prevent the reception of a second nonbusy pulse during a given time (corresponding to the reference time Tref0) after a first nonbusy pulse has been received, the program returns to the step S11.

Figure 6:
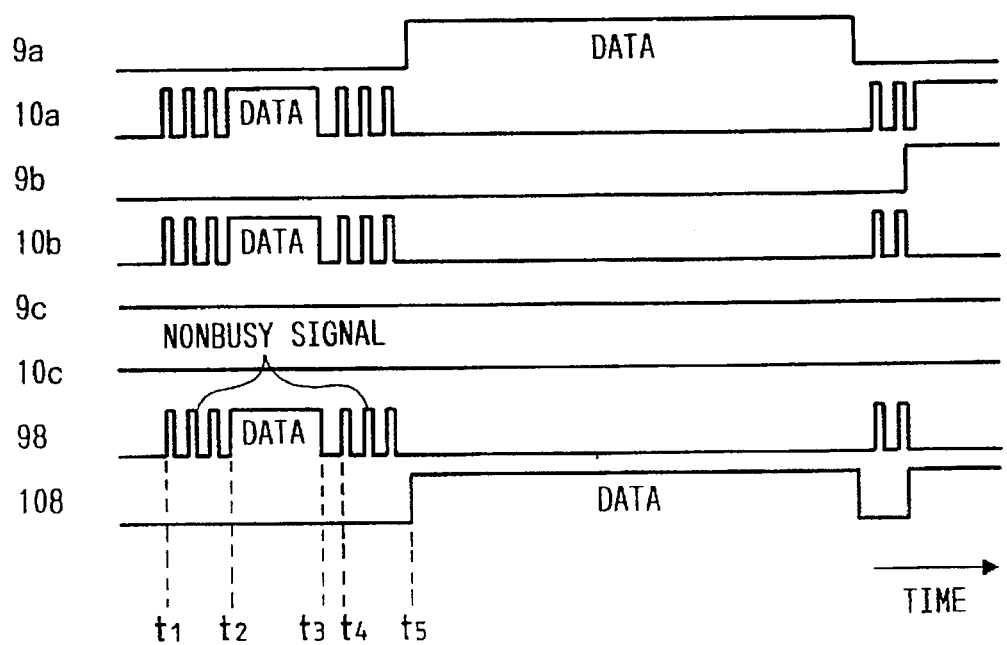
FIG. 6 is a time-domain diagram of various signals in the wireless LAN system of FIG. 1.

An example of operation of the wireless LAN system will be described hereinafter with reference to FIG. 6. At a moment t1, the central device 8 starts to transmit a nonbusy signal as an optical signal 98. During the interval between the moment t1 and a subsequent moment t2, the central device 8 continues to periodically transmit a nonbusy signal as an optical signal 98. At the moment t2, the central device 8 terminates the transmission of a nonbusy signal but starts to transmit communication data as an optical signal. During the interval between the moment t2 and a subsequent moment t3, the central device 8 continues to transmit communication data as an optical signal 98. At the moment t3, the central device 8 terminates the transmission of communication data. At a moment t4 immediately after the moment t3, the central device 8 restarts to transmit a nonbusy signal as an optical signal 98. During the interval between the moment t4 and a subsequent moment t5, the central device 8 continues to periodically transmit a nonbusy signal as an optical signal 98.

Since the terminal device 7a is located in the service zone of the central device 8, the optical signal 98 is received by the terminal device 7a as an optical signal 10a. Since the terminal device 7b is also located in the service zone of the central device 8, the optical signal 98 is received by the terminal device 7b as an optical signal 10b. Since the terminal device 7c is outside the service zone of the central device 8, the optical signal 98 is not received by the terminal device 7c so that an optical signal 10c received by the terminal device 7c remains null independent of the optical signal 98.

It is now assumed that, during the interval between moments t2 and t4, all the terminal devices 7a, 7b, and 7c are required to transmit communication signals and hence they generate ready signals therein. After the central device 8 terminates the transmission of communication data, the terminal devices 7a and 7b receive a first nonbusy signal at the moment t4. The terminal devices 7a and 7b start the previously-mentioned process of generating a transmission starting command signal in response to the first nonbusy signal. It is assumed that, during the process, the random number "n" is set to "3" in the terminal device 7a while the random number "n" is set to "5" in the terminal device 7b. Since the random number "n" is set to "3" in the terminal device 7a, the terminal device 7a generates a transmission starting command signal and hence starts to transmit communication data as an optical signal 9a at the moment t5 immediately after the reception of a third nonbusy signal but before the occurrence of a possible next nonbusy signal. After the moment t5, the terminal device 7a continues to transmit communication data as an optical signal 9a.

The optical signal 9a is received by the central device 8 as an optical signal 108. At the moment t5, the central device 8 starts to receive the communication data from the terminal device 7a. After the moment t5, the central device 8 continues to receive the communication data from the terminal device 7a. The central device 8 suspends the generation of a nonbusy signal in response to the reception of the communication data. The central device 8 continues to suspend the generation of a nonbusy signal during the reception of the communication data. Therefore, after the moment t5, the central device 8 does not transmit any nonbusy signal as long as the communication data is received. Thus, after the moment t5, the terminal device 7b is prevented from receiving fourth and later nonbusy signals so that the terminal device 7b is inhibited from transmitting communication data as an optical signal 9b. In this way, the terminal device 7b remains inhibited from transmitting an active optical signal 9b while the terminal device 7a continues to transmit an active optical signal 9a. Since the terminal device 7c does not receive any nonbusy signal, the terminal device 7c does not transmit any active optical signal 9c.

The random number "n" in the terminal device 7a and the random number "n" in the terminal device 7b provide different priorities to the terminal devices 7a and 7b respectively. One of the terminal devices 7a and 7b, which is provided with higher one of the different priorities, is permitted to transmit communication data while the other is inhibited from transmitting communication data.

The step S19 in FIG. 5 may be modified to decide whether or not the counted number X has reached a number given by a predetermined function of the random number "n".

The central device 8 and each of the terminal devices 7a, 7b, and 7c may be modified to provide the following functions. When a terminal device is required to transmit communication data to the central device 8, the terminal device transmits a connection requirement signal to the central device 8. The central device 8 transmits a connection answer signal to the terminal device in response to the connection requirement signal. When the terminal device receives the connection answer signal and therefore confirms the establishment of the connection with the central device 8, the terminal device starts to transmit communication data to the central device 8. When the terminal device fails to receive the connection answer signal, the terminal device does not transmit communication data to the central device 8.

Figure 7:
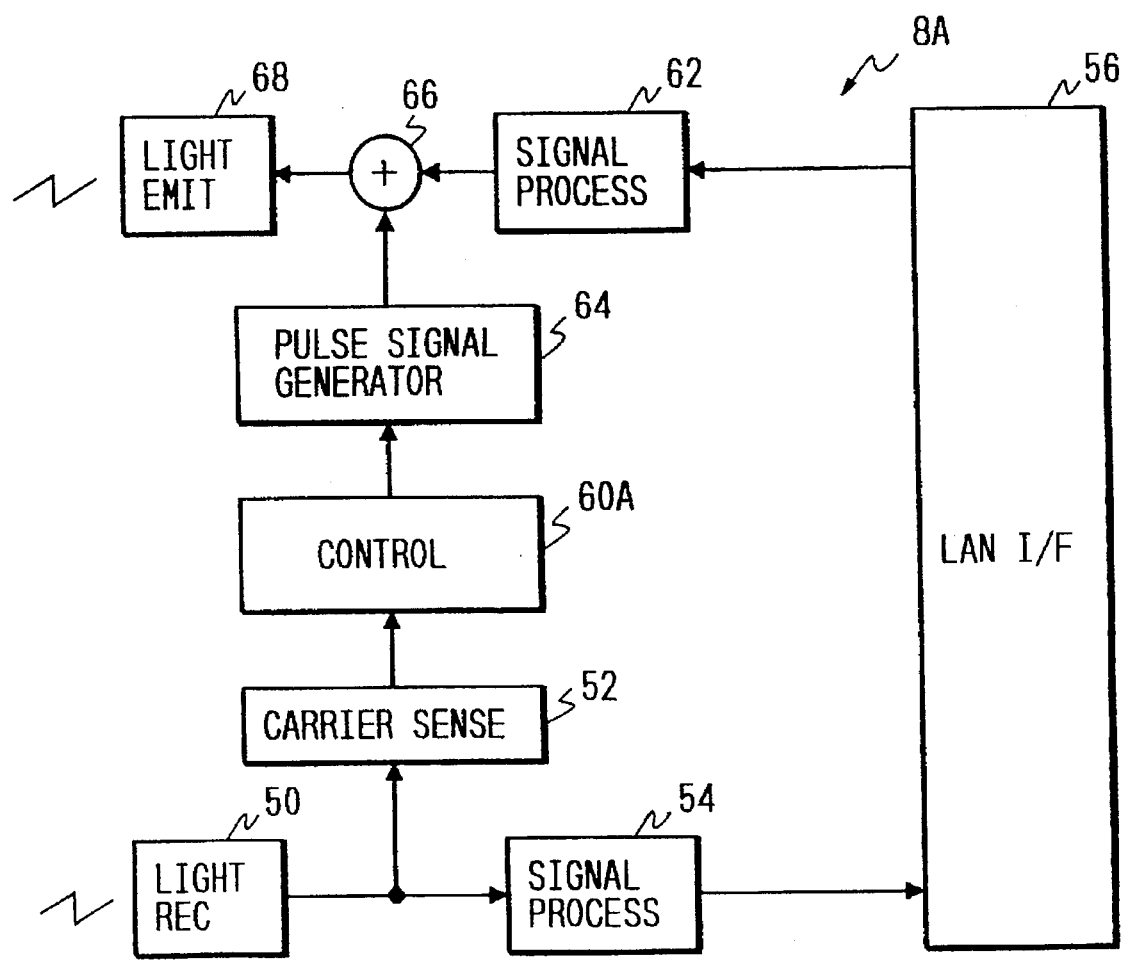
FIG. 7 is a block diagram of a modified communication controller.

The central device (communication controller) 8 of FIG. 2 may be replaced by a central device (communication controller) 8A of FIG. 7. The central device 8A of FIG. 7 is similar to the central device 8 of FIG. 2 except that the carrier sensor 58 (see FIG. 2) is omitted and the controller 60 (see FIG. 2) is replaced by a controller 60A. Accordingly, the central device 8A lacks the function of detecting the presence or the absence of a carrier "b".

Figure 8:
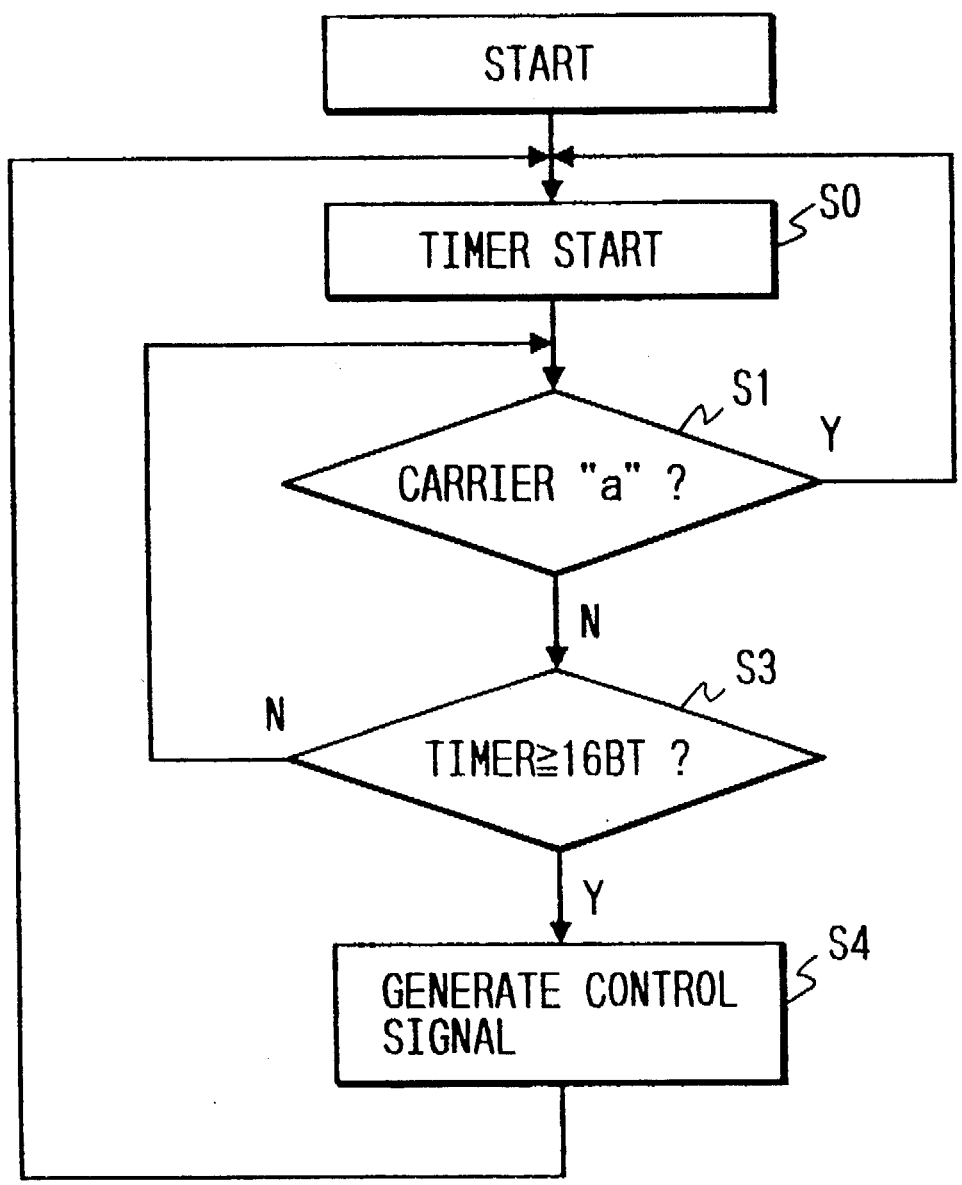
FIG. 8 is a flowchart of a program for operating a controller in FIG. 7.

The controller 60A includes a CPU having a combination of a processing section, an I/O port, a ROM, and a RAM. The controller 60A operates in accordance with a program stored in the ROM. FIG. 8 is a flowchart of the program. The program of FIG. 8 is similar to the program of FIG. 3 except that the step S2 (see FIG. 3) for deciding whether the carrier "b" is present or absent is omitted. Accordingly, in this case, when a carrier "a" remains absent, the controller 60A periodically outputs a trigger pulse to a pulse signal generator 64 at a period substantially corresponding to 16 BT.

What is claimed is:

1. A wireless communication network system comprising:
    a communication controller; and
    a plurality of terminal devices which communicate with the communication controller by wireless;
    wherein the communication controller comprises first means for detecting absence of a received signal from any of the terminal devices, second means responsive to an output signal of the first means for periodically generating a nonbusy signal, discriminated from another signal transmitted from the communication controller, in the absence of the received signal, and third means for transmitting the periodically-generated nonbusy signal to the terminal devices by wireless,
    wherein each of the terminal devices comprises:
        fourth means for detecting the nonbusy signal;
        fifth means responsive to an output signal of the fourth means for permitting transmission from said each terminal device after the nonbusy signal is received by the fourth means thereto;

sixth means for setting a random number in response to a first nonbusy signal;

seventh means for counting the periodically-generated nonbusy signal received by said sixth means;

eighth means for deciding whether or not a count of the received nonbusy signal and the random number have a predetermined relationship; and ninth means for starting transmission before a next nonbusy signal is received in cases where the count of the nonbusy signal and the random number are in the predetermined relation.

2. The wireless communication network system of claim 1, wherein the nonbusy signal has a predetermined duration shorter than a shortest length of data in a data signal to be transmitted.

3. The wireless communication network system of claim 1, wherein the nonbusy signal contains a predetermined address different from addresses assigned to said plurality of terminal devices.

4. The wireless communication network system of claim 1, wherein the nonbusy signal has a predetermined frequency different from a frequency of a data signal to be transmitted.

5. The wireless communication network system of claim 1, wherein said communication controller comprises a host device.

6. The wireless communication network system of claim 5, wherein each of the nonbusy signals has a predetermined duration shorter than a signal packet length.

7. A wireless LAN communication network system comprising:

a LAN line;

a communication controller connected to the LAN line; and a plurality of terminal devices which communicate with the communication controller by wireless;

wherein the communication controller comprises first means for detecting absence of a transmission signal from the LAN line and absence of a received signal from any of the terminal devices, second means responsive to an output signal of the first means for periodically generating a nonbusy signal, different from another signal transmitted from the communication controller, in the absence of the transmission signal and the absence of the received signal, and third means for transmitting the periodically-generated nonbusy signal to the terminal devices by wireless, wherein each terminal device comprises:

fourth means for detecting the nonbusy signal;

fifth means responsive to an output signal of the fourth means for permitting transmission from said each terminal device after the nonbusy signal is received by the fourth means thereof;

sixth means for setting a random value in response to a first nonbusy signal;

seventh means for counting the periodically-received nonbusy signal;

eighth means for deciding whether or not a counted value of the nonbusy signal and the random value are in a predetermined relationship; and ninth means for starting transmission before a next nonbusy signal is received in cases where the counted value of the nonbusy signal and the random value are in the predetermined relation.

8. The wireless LAN communication network system of claim 7, wherein the nonbusy signal has a predetermined duration shorter than a shortest length of data in a data signal to be transmitted.

9. The wireless LAN communication network system of claim 7, wherein the nonbusy signal contains a predetermined address different from addresses assigned to said plurality of terminal devices.

10. The wireless LAN communication network system of claim 7, wherein the nonbusy signal has a predetermined frequency different from a frequency of a data signal to be transmitted.

11. The wireless LAN communication network system of claim 7, wherein each of the nonbusy signals has a predetermined duration shorter than a signal packet length.

12. A terminal device for use in a wireless communication network system, comprising:

first means for receiving a nonbusy signal;

second means responsive to an output signal of the first means for permitting data transmission after the nonbusy signal is received by the first means;

third means responsive to the output signal of the first means for setting a random number in response to a first nonbusy signal;

fourth means for counting periodically-received nonbusy signals received by said first means;

fifth means for deciding whether or not a count of the nonbusy signals received by said first means and the random number have a predetermined relationship; and sixth means for starting transmission before a next nonbusy signal is received in cases where the count of the nonbusy signal and the random number are in the predetermined relation.

* * * * *